(12) United States Patent
De Pasquale et al.

(10) Patent No.: US 9,398,596 B2
(45) Date of Patent: Jul. 19, 2016

(54) METHOD AND DEVICES FOR ALLOCATING PS TRAFFIC IN A MULTI-TECHNOLOGY WIRELESS COMMUNICATION NETWORK

(71) Applicant: Vodafone IP Licensing Limited, Newbury, Berkshire (GB)

(72) Inventors: Andrea De Pasquale, Madrid (ES); Francisco Javier Dominguez Romero, Madrid (ES); Ricardo Jose Monteiro Alves, Madrid (ES)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 47 days.

(21) Appl. No.: 13/852,859

(22) Filed: Mar. 28, 2013

(65) Prior Publication Data
US 2013/0258887 A1    Oct. 3, 2013

(30) Foreign Application Priority Data

Mar. 29, 2012    (ES) .................................. 201230473

(51) Int. Cl.
| | |
|---|---|
| H04L 12/26 | (2006.01) |
| H04W 72/08 | (2009.01) |
| H04W 36/22 | (2009.01) |
| H04W 28/16 | (2009.01) |
| H04W 36/14 | (2009.01) |
| H04W 88/06 | (2009.01) |
| H04W 88/10 | (2009.01) |

(52) U.S. Cl.
CPC ............ *H04W 72/085* (2013.01); *H04W 28/16* (2013.01); *H04W 36/22* (2013.01); *H04W 36/14* (2013.01); *H04W 88/06* (2013.01); *H04W 88/10* (2013.01)

(58) Field of Classification Search
None
See application file for complete search history.

(56) References Cited

U.S. PATENT DOCUMENTS

| 2008/0192629 A1* | 8/2008 | Chari .................. H04L 12/5693 370/230 |
| 2010/0041424 A1* | 2/2010 | Osborn .................. H04L 63/083 455/466 |

FOREIGN PATENT DOCUMENTS

| WO | WO2008/026978 A1 | 3/2008 |
| WO | WO2008/155444 A1 | 12/2008 |
| WO | WO2010/068155 A1 | 6/2010 |

OTHER PUBLICATIONS

Spanish Search Report for 201230473 dated Mar. 29, 2012.
EPO: European Search Report for EP 13161303.6—1854 dated Jun. 13, 2013.

* cited by examiner

*Primary Examiner* — Afshawn Towfighi
(74) *Attorney, Agent, or Firm* — Workman Nydegger

(57) ABSTRACT

A method, base station and controller for allocating PS traffic in mobile networks which provide a plurality of RATs (multi-RAT networks) for supporting Packet Services, which comprises:
  identifying more than one RAT with free bandwidth,
  determining a type of traffic which belongs to a PS connection initially established over a initial RAT,
  classifying Packet Services by taking into account at least one parameter which is the previously determined type of traffic,
  selecting at least one of the identified RAT for establishing the PS connection in accordance to the previous classification of the Packet Service.

The classification of the Packet Service can additionally take into account other parameters: QoS, measured RTT, load of each RAT and combination of these parameters.

20 Claims, 3 Drawing Sheets

METHOD AND DEVICES FOR ALLOCATING PS TRAFFIC IN A MULTI-TECHNOLOGY WIRELESS COMMUNICATION NETWORK

CROSS REFERENCE TO RELATED APPLICATIONS

This application claims priority to Spanish Application Number P201230473, filed on Mar. 29, 2012, the entirety of which is incorporated herein by reference.

TECHNICAL FIELD OF THE INVENTION

The present invention has its application within the telecommunications sector and, especially, in the industrial area engaged in providing Radio Access Networks (RANs) with elements of cellular infrastructures such as Base Stations and Radio Controllers, for Second Generation (2G), Third Generation (3G) and Beyond 3G mobile communications.

More particularly, the invention described herein relates to a method and a device implemented in a radio network entity for the allocation of Packet Switched (PS) traffic in wide area cellular networks supporting multiple wireless communications technologies (GSM-GPRS, UMTS, HSPA, LTE, LTE-Advanced, ... ).

BACKGROUND OF THE INVENTION

In the current deployed 3G networks, the usage of Packet Switched (PS) traffic for Packet Services has boomed. A similar trend is apparent in the take up of different mobile client applications ("apps") and the usage of cellular data connectivity as a mobile alternative to fixed line broadband network access, such as Asymmetric Digital Subscriber Line (ADSL)—often referred to a "mobile broadband".

Both driving and responding to this trend, Higher Speed Packet Access technologies (HSPA, HSPA+) are being implemented thereby increasing the achievable throughput for these users. The main economical model for network operators is, however, based on Flat Rate Tariff or sub-versions of these rates ("unlimited" data with fair usage caps).

In certain Beyond 3G scenarios sometimes referred to as "4G", Long Term Evolution (LTE) technology is introduced in cellular networks that already provide access using existing 3G (UMTS) and 2G (GSM-GPRS) technologies (with substantially overlapping geographical coverage).

FIG. 1 shows an example of network scenario where the coverage of the different technologies is overlapped: GSM coverage 11, UMTS coverage 12 and LTE coverage 13. There is single node or site 10 where all the three base stations of the aforementioned technologies are located: Base Transceiver Station (BTS) for GSM, Node B for UMTS and evolved NodeB (eNode B) for LTE. The network entities implementing the functionality of Controllers are connected between the respective base stations and the Core Network 101. This, the BTS from GSM is connected to the Base Station Controller (BSC), the Node B from UMTS is connected to the Radio Network Controller (RNC), both BTS and RNC are in turn connected to the Core Network 101, and the eNode B, which integrates both functionalities of base station and controller, is connected directly from the LTE access network to the Core Network 101. The core network infrastructure is composed to Circuit Switched (CS) and Packet Switched (PS) domains that are connected to the different wireless access technologies. The site 10 is in charge of redirecting the traffic from the base station to the corresponding controller and vice versa (uplink and downlink): 2G traffic 111 is handled by the BSC, 3G traffic 112 is handled by the RNC and LTE traffic 113 flows directly between the eNodeB and the Core Network 101.

At the moment, when each of these three radio technologies (GSM-GPRS, UMTS, LTE) is available for to users, every User Equipment (UE) would, by default, camp on the technology assigned the highest priority level by the mobile network operator, i.e. LTE over UMTS over GPRS. A UE is only typically redirected to another technology where there is a high likelihood of losing and/or coverage or capacity. This criterion for redirecting a user to a radio technology is not optimum for most of the applications, as the requirements (e.g., latency sensitivity) for each application is different.

On the other hand, in UMTS, the user equipment (UE) measures and reports the received level of the pilot energy-per-chip-to-total-widebandinterference-density ratio, or Ec/I0, for the handover cell selection. The pilot power determines the cell coverage area and the average number of UEs connected to the cell. Thus, the adjusting of pilot powers can be applied to balance the cell load among neighboring cells. The cell load is measured as the ratio of total transmission power to the target transmission power. Also, the current enhanced UMTS Radio Access Network (eUTRAN) standards have self-organising network and load balancing operations between base stations (enodes B) by using a direct (X2) interface to exchange information between the base stations (e.g., this information may be a ratio or percentage of the used physical resource blocks—PRBs— for a type of traffic over the total available PRBs— in the same link direction over a certain time interval.

There is therefore a need to optimise traffic allocation in the wireless networks where different mobile technologies (2G, 3G, 4G, ... ) are overlapped for the different customers, each technology providing their own coverage and quality in terms of bandwidth available and latency in the network and having customers with mobile terminals (UEs) which support more than one or even all the technologies.

SUMMARY OF THE INVENTION

The present invention seeks to address the aforesaid need by taking a decision on allocating the PS traffic to a given Radio Access Technology (RAT) of the available RATs in the multi-wireless network, the decision being based on the correlation of at least:
- the available bandwidth of the different RATs (known by the network entities of the radio access networks);
- the type of PS traffic (determined by packet inspection); and
- the class of the packet application or service (defined according to, for example, the average delay experienced by packets of each different type of traffic over each of the RAT or in accordance to a QoS parameter indicating User Priority).

The present invention allows the Packet Services traffic management in the mobile networks with different overlapping radio access technologies based on the knowledge of the different applications/services going through the respective mobile network and the network load of each RAT (in one or more cell of that RAT).

In order to have this knowledge, firstly it is necessary to inspect the packets in order to detect the type of traffic. With just basic IP and TCP/UDP (Internet Protocol and Transport Control Protocol/User Datagram Protocol) header inspection, it is possible to know the protocol used for carrying the packets (i.e., the type of PS traffic): Hypertext Transfer Protocol (HTTP), File Transfer Protocol (FTP), Internet Control Message Protocol (ICMP), Simple Mail Transfer Protocol (SMTP), Point-to-Point (P2P) . . . .

The network entities implemented in the Controllers or the Base Stations of the radio access networks have knowledge of the load of each cell covered by the different RATs serving a user equipment (UE). For instance, in a 3G network, the Radio Network Controller (RNC) have knowledge of the 2G, 3G, and 4G load of the different serving cells managed by this RNC. Also the RNC comprises means for inspecting the packets and so, the RNC can take the decision to move certain traffic to 2G or 4G or leave it in 3G.

In order to make the aforementioned decision in an optimal way, in addition to the measuring of the network load conditions, other parameters are proposed to be taken into account. For example, a preferred parameter is the round-trip delay time or round-trip time (RTD or RTT) of the packets which can be measured for each available RAT. These measurements combined with traffic type information, (and, potentially, with even more precise info on the exact application to be carried, obtained by Deep Packet Inspection or DPI) make possible to assign packets of an incoming PS connection to the RAT whose load is providing the highest likelihood to serve the packets with the highest quality to the end user.

Moreover, optionally, the decision to redirect the traffic of a user to one RAT or another can also use the QoS (Quality of Service) Priority associated with the user; for example, depending on whether said QoS parameter, which indicates User Priority or Subscriber class, is Golden, Silver or Bronze.

An aspect of the invention refers to a method for allocating PS traffic in mobile networks which provide a plurality of RATs (multi-RAT networks) for supporting Packet Services, which comprises the steps of:
  identifying one or more of the provided RAT with free bandwidth,
  determining a type of traffic (which belongs to a PS connection) to be transmitted,
  classifying Packet Services with which the data traffic is associated, by taking into account at least the previous determined type of data traffic;
  selecting at least one of the identified RAT in accordance with the classification of the Packet Service,
  establishing a Packet Switched connection for transmission of the data traffic over one of the at least one selected radio access technology.

Note that the PS connection is established over a initial RAT which is identified when the type of traffic is detected, as this step involves communications with a network entity of the RAT from which the traffic comes.

Another aspect of the invention deals with a network entity which can be implemented either in a node of the radio access network serving as a base station (i.e., NodeB in 3G, 4G base station which is called the evolved NodeB or eNodeB) either in a node of the access network serving as a radio controller (i.e., BSC in 2G, RNC in 3G, eNodeB which plays the functions of network controller in 4G), and which comprises processing means for performing the method described before.

A further aspect of the invention refers to a computer program product which comprises program code means to be loaded into processing means of a base station controller in order to execute the described method.

DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DETAILED DESCRIPTION OF THE INVENTION

Figure 1:
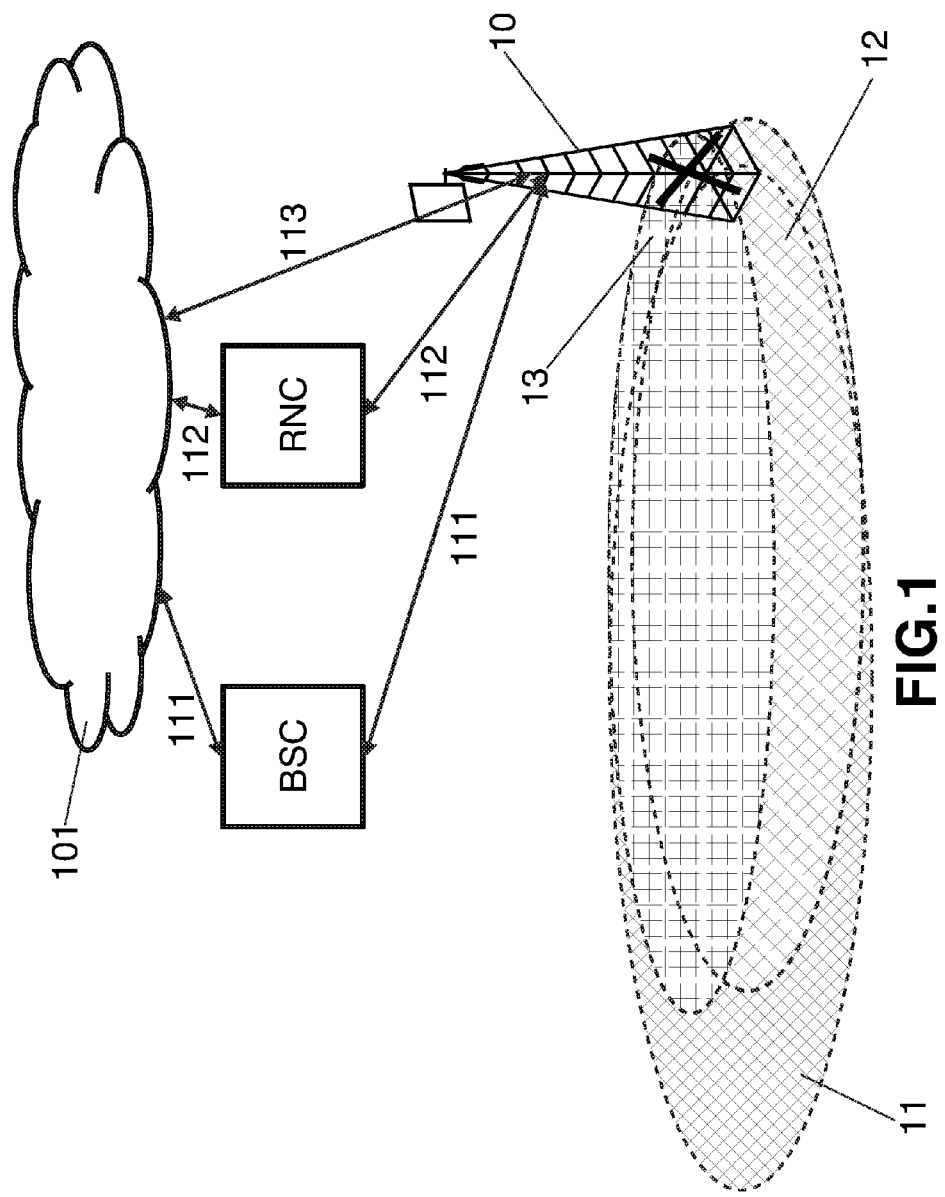
FIG. 1 shows a network scenario where coexists three different radio access technologies with substantially overlapping of their coverage.
Figure 2:
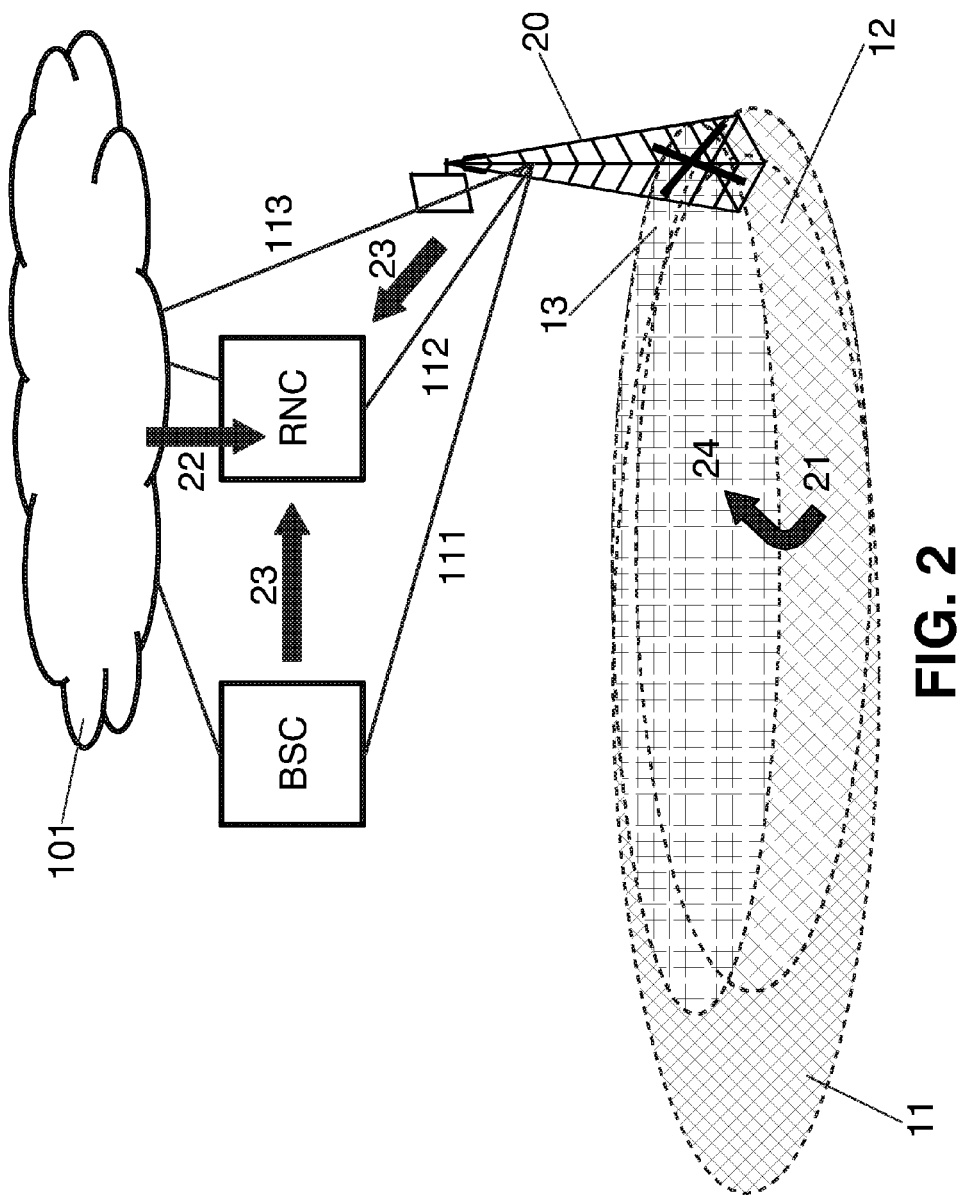
FIG. 2 shows a network scenario with overlapped coverage of three different radio access technologies where PS traffic is allocated to one of the three different radio access technologies in accordance to a possible embodiment of the invention.

A preferred embodiment of the invention is focused on a method of PS traffic allocation in a mobile network as shown in FIG. 2 supporting three RATs covered by a single site 20: GSM-GPRS, UMTS and LTE.

The mobile network have the knowledge on the RAT identification, because the RNC in 3G radio access (or the eNodeB in 4G-LTE or the BSC for 2G case) is aware of the available technologies within the geographical area (i.e., cell) from which a specific PS call is originated, thanks to internal database configured by the mobile network operator in said nodes (RNC, eNodeB, BSC).

Normally the PS call is started within a specific RAT, e.g., in FIG. 2, the initial RAT 21 is 3G. In order to identify to which application said PS call belongs, i.e., the type of traffic involved in this PS established call, a packet inspection is carried out. In a simple form of packet inspection, the source port number of the IP packets is analyzed and, since some applications (e.g. HTTP) are always associated to the same port number, it is possible to understand the type of traffic belonging to an application. In a more complex form, the content of the packets is analyzed by Deep Packet Inspection (DPI) modules (e.g., looking at application control information exchanged at the beginning of an application exchange between client and server, or even looking at the traffic pattern) so that the exact application can be identified. This detection of traffic type by packet inspection is performed by the controller entity, e.g., in FIG. 2, the RNC detects 22 the type of 3G traffic 112. In addition, the controller knows the available bandwidth in the initial RAT and the other RATs because the controllers of the other RATs exchange load information with the controller of the initial RAT, e.g. FIG. 2 shows the RNC gathering load information from the BSC and the eNode B. Having all these data, traffic type and load information, the RNC decides whether to keep traffic allocated to the same (initial) RAT, i.e., 3G, or handover to other technology 24, for instance, to LTE in the example of FIG. 2.

Figure 3:
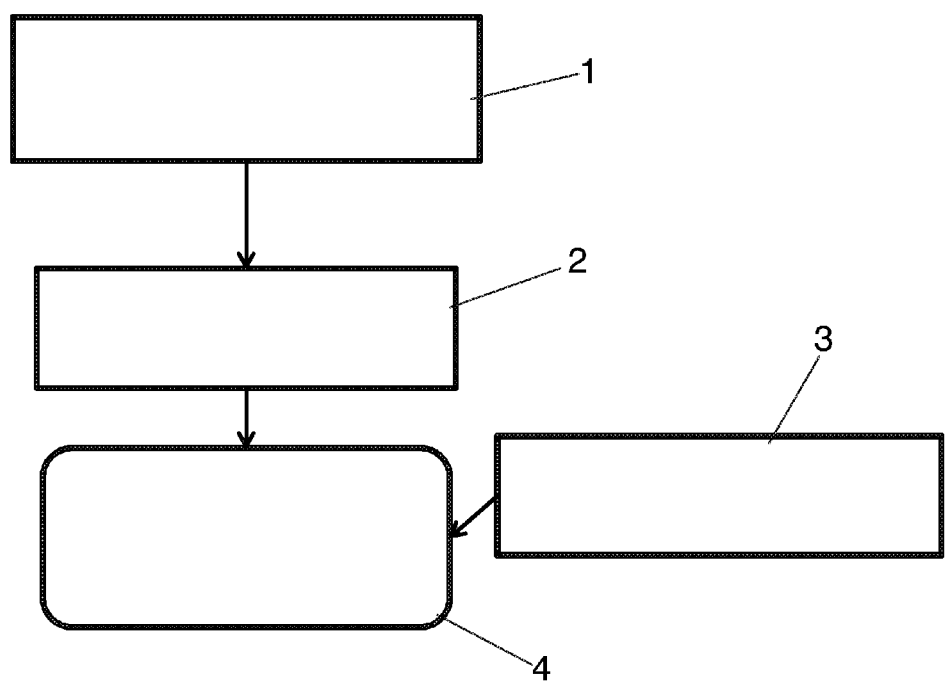
FIG. 3 shows a process flow diagram with the main steps for assigning a radio technology to a user equipment in order to allocate its PS traffic, according to a possible embodiment of the invention.

FIG. 3 shows the steps followed in order to assign the user with a RAT to which the determined type of traffic is to be allocated. The method first identifies 1 the radio technologies which are available for the user, i.e., which RATs are capable of providing coverage to the UE. The type of traffic from/to the UE is detected 2 and, having the available capacity determined 3 for the user in each available RAT, the method decides 4 which RAT of the available ones is used by the UE to allocate the detected traffic.

In addition, the current Round Trip Time (RTT) of the packets involved in the PS application call on each of the identified RATs (GSM-GPRS, UMTS and LTE in this example) can be measured. The RTT experienced by the packets on a specific radio access technology can be measured for each type of traffic and User QoS priority in several ways:

A) At the Radio Link Control (RLC) level by RLC queues, measuring for all PS connections the average time difference between having a packet entering the RLC queue and the received acknowledgement, and averaging this measurement.

B) Same mechanisms as A, but with packets of the Medium Access Control (MAC) at the MAC-d level.

C) Same method as A but with packets at MAC-HS level starting from the moment in which a packet enters into a queue until the acknowledgment is received.

In all cases (A, B, C), an average delay of packets is measured on a sliding window comprising the last x seconds (e.g., x from 0.2 to 60 sec, with 0.1 sec of granularity) before starting the decision of the RAT for the incoming PS application call.

The RTT measurements can be obtained in average per cell and per RAT, or even per cell/RAT and QoS priority User class (e.g., per Gold users, Silver users and Bronze users).

A possible embodiment of the invention can be implemented in a RNC, which have a table configured by the operator with the different preferred RATs depending on the QoS priority User class and the type of traffic, as shown for example in the following table 1:

TABLE 1

| Type of traffic | QoS | Preferred RAT |
| --- | --- | --- |
| http | Gold | LTE |
| ftp | Gold | LTE or UMTS |
| P2P | Gold | LTE or UMTS |
| http | Silver | LTE |
| ftp | Silver | UMTS |
| P2P | Silver | UMTS or LTE |
| http | Bronze | UMTS |
| ftp | Bronze | UMTS |
| P2P | Bronze | UMTS |
| Background applications (low data, relative urgency) | Gold | UMTS |
| Background applications (low data, relative urgency) | Silver | 2G |
| Background applications (low data, relative urgency) | Bronze | 2G |

That is, the proposed method allows a mapping between QoS priority and radio access technologies.

Another embodiment of the invention can be implemented in a RNC, which have a table configured by the operator with the different preferred RATs depending on the experienced RTT for each identified application together with the QoS priority User class, as shown for example in the following table 2:

TABLE 2

| Type of traffic | QoS | Preferred RAT |
| --- | --- | --- |
| http | Gold | The one with the lowest RTT |
| http | Silver | The one with the lowest RTT |
| http | Bronze | RAT with highest RTT |
| ftp | Gold | The one with the lowest RTT |
| ftp | Silver | LTE if RTT difference is lower than 20 ms |
| ftp | Bronze | RAT with highest RTT |
| P2P | Gold | LTE |
| P2P | Silver | UMTS |
| P2P | Bronze | UMTS |

TABLE 2-continued

| Type of traffic | QoS | Preferred RAT |
| --- | --- | --- |
| Background applications (low data, relative urgency) | Gold | UMTS |
| Background applications (low data, relative urgency) | Silver | GPRS |
| Background applications (low data, relative urgency) | Bronze | GPRS |
| Instant Messaging | Gold | The one with the lowest RTT |
| Instant Messaging | Silver | The one with the lowest RTT |
| Instant Messaging | Bronze | RAT with highest RTT |

For example Web applications require a very low latency or RTT, thus the UE using Web apps should be redirected to the lowest RTT technology. Other applications such as FTP downloading, are resilient to latency, but exhibit large peak rates in downlink while data is download. Another example is the voice or video over IP, which should be carried over the lowest RTT because the quality of the experience (QoE) for the user is much better.

Once the decision phase has been executed and the most suitable technology is selected (based on operator preference stored into the table), the network can order a Handover (HO) to the selected RAT, if needed (that is to say, if the most suitable technology for the specific application is not the one in which the PS call has been established initially).

Thus, the proposed method allows PS traffic steering, handover and redirection management based on the specific application of the packets.

In case the number of HOs is too high in the network, in order to reduce the amount of traffic for HOs, the aforementioned HO can be executed only if the detected application has an average duration time higher than Y seconds (such average duration time Y is a statistical measurement provided to the RNC by the operator analyzing internet traffic in its network).

When LTE or UMTS are the possible options to be assigned with the application call, the "emptiest technology" (i.e. the RAT with the most free bandwidth) can be selected/decided by terms of capacity. The 3G capacity is well known by the RNC. The LTE capacity can be obtained by the RNC from the standard.

As a example, consider a scenario where there are three substantially collocated cells, providing (respectively) GPRS, UMTS and LTE coverage for a UE. The UE is camped in UMTS for example. Then the UE starts to handle web browsing requests. Then the RNC decides that the web browsing should be carried over LTE, since this technology has the best RTT (40 ms as compared to 55 ms in 3G). Then the RNC performs a handover given that both technologies (UMTS and LTE) have free capacity available at that moment. A second user (whose priority is bronze, say) downloading big e-mails, this second user stays camped on 3G because he does not need good RTT and there is available bandwidth in 3G. If a third user also downloads e-mails but has a higher priority (gold, say), this third user is redirected to LTE to have a better throughput. GPRS is used only when losing coverage or the capacity of 3G and LTE is less than 5% (in this given example).

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. A method of establishing a Packet Switched connection for transmission of data traffic by a mobile device, the mobile device being positioned in a mobile network having a plurality of radio access technologies (RATs) that support Packet Services, the method comprising:
   identifying, by a portion of the mobile network other than the mobile device, which of the RATs of the plurality of RATs have free bandwidth,
   establishing an initial Packet Switched connection with the mobile device over a first RAT of the plurality of RATs,
   determining, by the portion of the mobile network, the type of data traffic associated with the initial Packet Switched connection based on information therein,
   classifying, by the portion of the mobile network, the Packet Services with which the data traffic is associated by taking into account the determined type of data traffic,
   selecting, by the portion of the mobile network, a second RAT based on the classification of the Packet Services, the second RAT being different than the first RAT, the second RAT being one of the RATs having free bandwidth, and
   establishing, by the portion of the mobile network, a subsequent Packet Switched connection over the second RAT for the mobile device to transmit the data traffic.

2. The method according to claim 1, wherein selecting the second RAT takes into account each value of Round Trip Time measured in each of the identified RATs for packets of the determined type of data traffic.

3. The method according to claim 1, wherein selecting the second RAT takes into account a user Quality of Service (QoS) priority associated with the type of data traffic.

4. The method according to claim 1, wherein selecting the second RAT comprises selecting the RAT having the widest free bandwidth.

5. The method according to claim 1, wherein establishing the subsequent Packet Switched connection over the second RAT comprises: performing a handover of the initial Packet Switched connection of the mobile device from the first RAT to the second RAT.

6. The method according to claim 5, wherein the handover is performed only when the Packet Service has an average duration time higher than a time threshold configured by the mobile network operator.

7. The method according to claim 1, wherein determining the type of data traffic is performed by an IP header inspection.

8. The method according to claim 1, wherein determining the type of data traffic is performed by deep packet inspection.

9. The method according to claim 1, further comprising assigning the mobile device, by the mobile network, to use the second RAT corresponding to the subsequent Packet Switched connection so that the data traffic is allocated thereto.

10. The method according to claim 1, wherein one or more of the steps of identifying, determining, classifying, selecting, and establishing are performed by a node of the mobile network.

11. The method according to claim 10, wherein the node serves as a base station or a controller of the mobile network.

12. The method according to claim 1, wherein the type of data traffic is determined by the portion of the mobile network based on information obtained by the portion of the mobile network over the first RAT in the initial Packet Switched connection.

13. A network entity of a radio access network (RAN), the network entity being other than a mobile device, the network entity being communicable with a mobile device positioned in the RAN, the network entity comprising:
   a processor;
   a memory;
   a Packet Switched traffic allocator adapted to redirect a Packet Switched connection from a first radio access technology (RAT) to a second RAT; and
   a Packet Service classifier,
   wherein the Packet Switched traffic allocator is adapted to select the second RAT from a plurality of available RATs identified as having free bandwidth, for establishing a Packet Switched connection over the second RAT to allocate data traffic of the mobile device thereon in accordance with a classification of Packet Services corresponding to the Packet Switched connection, and
   wherein the Packet Service classifier is adapted to classify the Packet Services corresponding to the Packet Switched connection taking into account at least one parameter that includes a determined type of traffic belonging to the Packet Switched connection.

14. The network entity according to claim 13, wherein the Packet Service classifier is configured to receive Round Trip Time measurements corresponding to packets of the determined type of traffic from each of the identified RATs for taking into account each value of Round Trip Time measured in the classification of Packet Services.

15. The network entity according to claim 13, wherein the Packet Service classifier is configured to receive Quality of Service (QoS) parameters indicating user priority for taking into account a user QoS priority associated with the established Packet Switched connection.

16. The network entity according to claim 13, wherein there are more than one selected RAT and the second RAT is the selected RAT with the widest free bandwidth.

17. The network entity according to claim 13, wherein the network entity is adapted to assign the mobile device to use the second RAT corresponding to the subsequent Packet Switched connection so that the data traffic of the mobile device is allocated thereto.

18. The network entity according to claim 13, wherein the network entity is a base station or controller of the radio access network.

19. The network entity according to claim 18, wherein the network entity is one of: a 2G BSC, a 3G NodeB, a 3G RNC and an LTE eNodeB.

20. A non-transitory computer program product comprising program code means which, when loaded into processing means of a node in a radio access network, make said program code means execute the method according to claim 1.

* * * * *